(12) United States Patent
Byun et al.

(10) Patent No.: US 11,173,455 B2
(45) Date of Patent: Nov. 16, 2021

(54) WATER TREATMENT MEMBRANE AND METHOD FOR MANUFACTURING SAME

(71) Applicant: LG CHEM, LTD., Seoul (KR)

(72) Inventors: Eunkyoung Byun, Daejeon (KR); Chong Kyu Shin, Daejeon (KR); Youngju Lee, Daejeon (KR); Hyungjoon Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 104 days.

(21) Appl. No.: 16/490,012

(22) PCT Filed: Apr. 18, 2018

(86) PCT No.: PCT/KR2018/004467
§ 371 (c)(1),
(2) Date: Aug. 29, 2019

(87) PCT Pub. No.: WO2018/194354
PCT Pub. Date: Oct. 25, 2018

(65) Prior Publication Data
US 2020/0009513 A1 Jan. 9, 2020

(30) Foreign Application Priority Data
Apr. 19, 2017 (KR) .......... 10-2017-0050529

(51) Int. Cl.
*B01D 69/12* (2006.01)
*B01D 69/10* (2006.01)
(Continued)

(52) U.S. Cl.
CPC ......... *B01D 69/125* (2013.01); *B01D 61/025* (2013.01); *B01D 67/0006* (2013.01);
(Continued)

(58) Field of Classification Search
CPC ...... B01D 71/56; B01D 69/10; B01D 69/125; B01D 67/0006; B01D 61/025; B01D 69/12; B01D 69/122; C02F 1/44
See application file for complete search history.

(56) References Cited

U.S. PATENT DOCUMENTS 4,689,375 A   8/1987   Lauterbach
8,733,558 B2  5/2014   Mickols et al.
(Continued)

FOREIGN PATENT DOCUMENTS

CN   1301587      7/2001
CN   102917775    2/2013
(Continued)

*Primary Examiner* — John Kim
(74) *Attorney, Agent, or Firm* — Dentons US LLP

(57) ABSTRACT

Provided is a water treatment membrane including: a porous support; and a polyamide active layer provided on the porous support, in which the polyamide active layer includes one or more units selected from among a unit of Chemical Formula 1:

[Chemical Formula 1]

(Continued)

a unit of Chemical Formula 2;

[Chemical Formula 2]

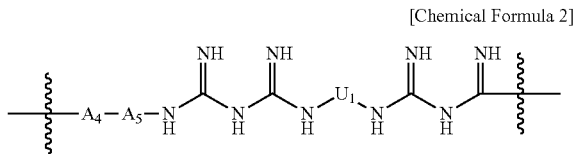

a unit of Chemical Formula 3;

[Chemical Formula 3]

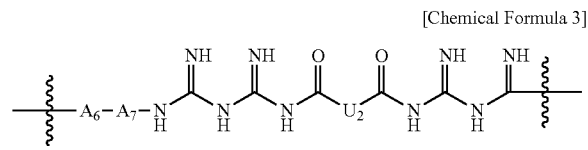

and a unit of Chemical Formula 4;

[Chemical Formula 4]

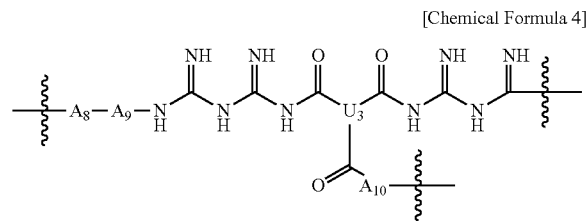

and a manufacturing method thereof.

10 Claims, 3 Drawing Sheets

(51) Int. Cl.
  *B01D 71/56* (2006.01)
  *B01D 67/00* (2006.01)
  *B01D 61/02* (2006.01)
  *C02F 1/44* (2006.01)
(52) U.S. Cl.
  CPC ............. *B01D 69/10* (2013.01); *B01D 69/12* (2013.01); *B01D 69/122* (2013.01); *B01D 71/56* (2013.01); *C02F 1/44* (2013.01)

(56) References Cited

U.S. PATENT DOCUMENTS

| | | |
|---|---|---|
| 2006/0065598 A1 | 3/2006 | Comstock |
| 2008/0000843 A1 | 1/2008 | Sasaki et al. |
| 2010/0233146 A1 | 9/2010 | McDaniel |
| 2011/0174720 A1 | 7/2011 | Chen et al. |
| 2011/0210062 A1 | 9/2011 | Wang et al. |
| 2011/0284454 A1 | 11/2011 | Mickols et al. |
| 2011/0284458 A1 | 11/2011 | Mickols et al. |
| 2013/0284665 A1 | 10/2013 | Lee et al. |
| 2015/0328588 A1 | 11/2015 | Schmidt-Leithoff et al. |
| 2017/0035814 A1 | 2/2017 | Chen et al. |
| 2017/0056837 A1 | 3/2017 | Goenaga et al. |
| 2017/0056840 A1 | 3/2017 | Koehler et al. |

FOREIGN PATENT DOCUMENTS

| | | |
|---|---|---|
| CN | 104994938 | 10/2015 |
| EP | 3354333 A1 | 8/2018 |
| JP | 2002-114754 | 4/2002 |
| JP | 2006-198461 | 8/2006 |
| JP | 2009-006315 | 1/2009 |
| JP | 2009-045595 | 3/2009 |
| JP | 2009-078218 | 4/2009 |
| JP | 2015-231624 | 12/2015 |
| KR | 10-2007-0086268 | 8/2007 |
| KR | 10-2013-0076498 | 7/2013 |
| KR | 10-2017-0035814 | 3/2017 |
| WO | 2007-018946 | 2/2007 |
| WO | 2011-046657 | 4/2011 |
| WO | 2017052256 | 3/2017 |

[Figure 1]
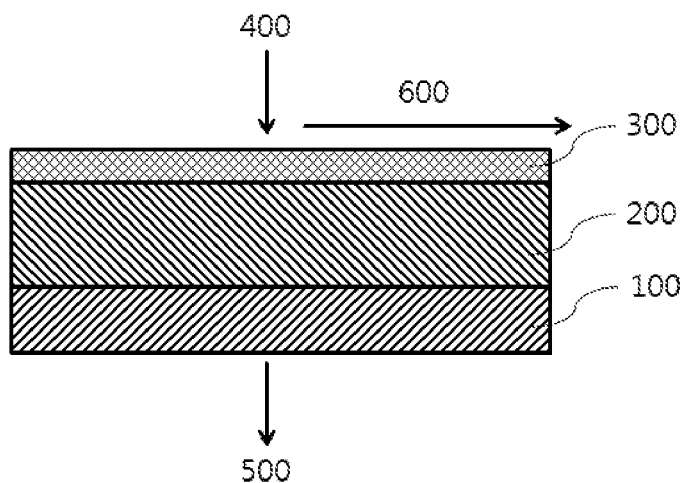
[Figure 2]
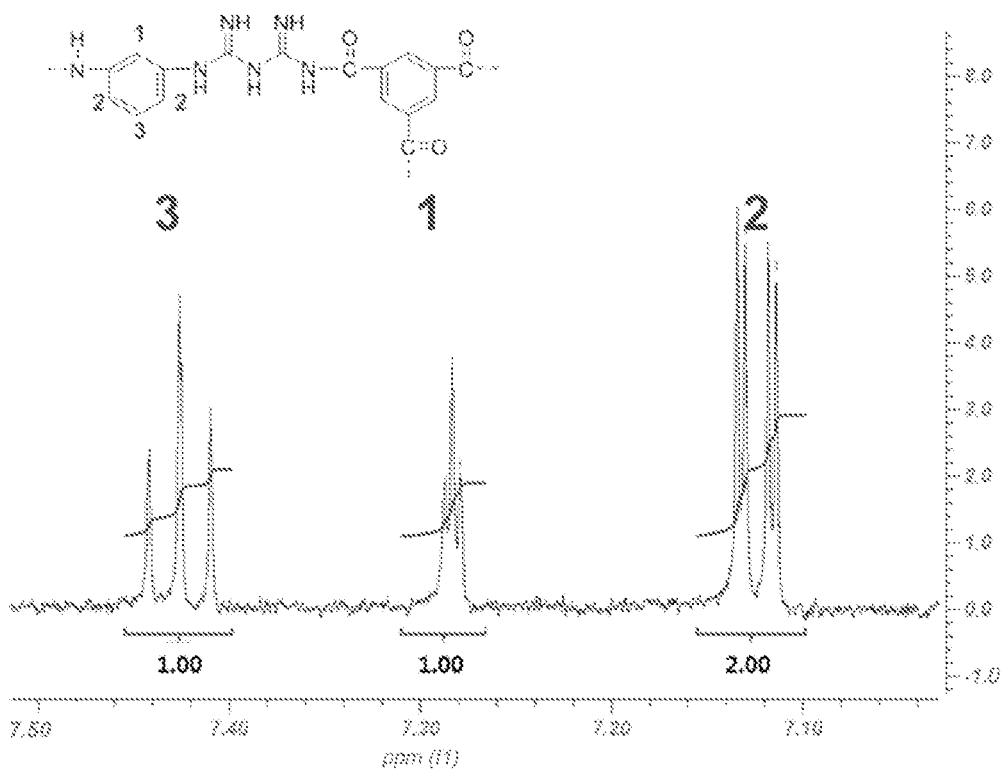

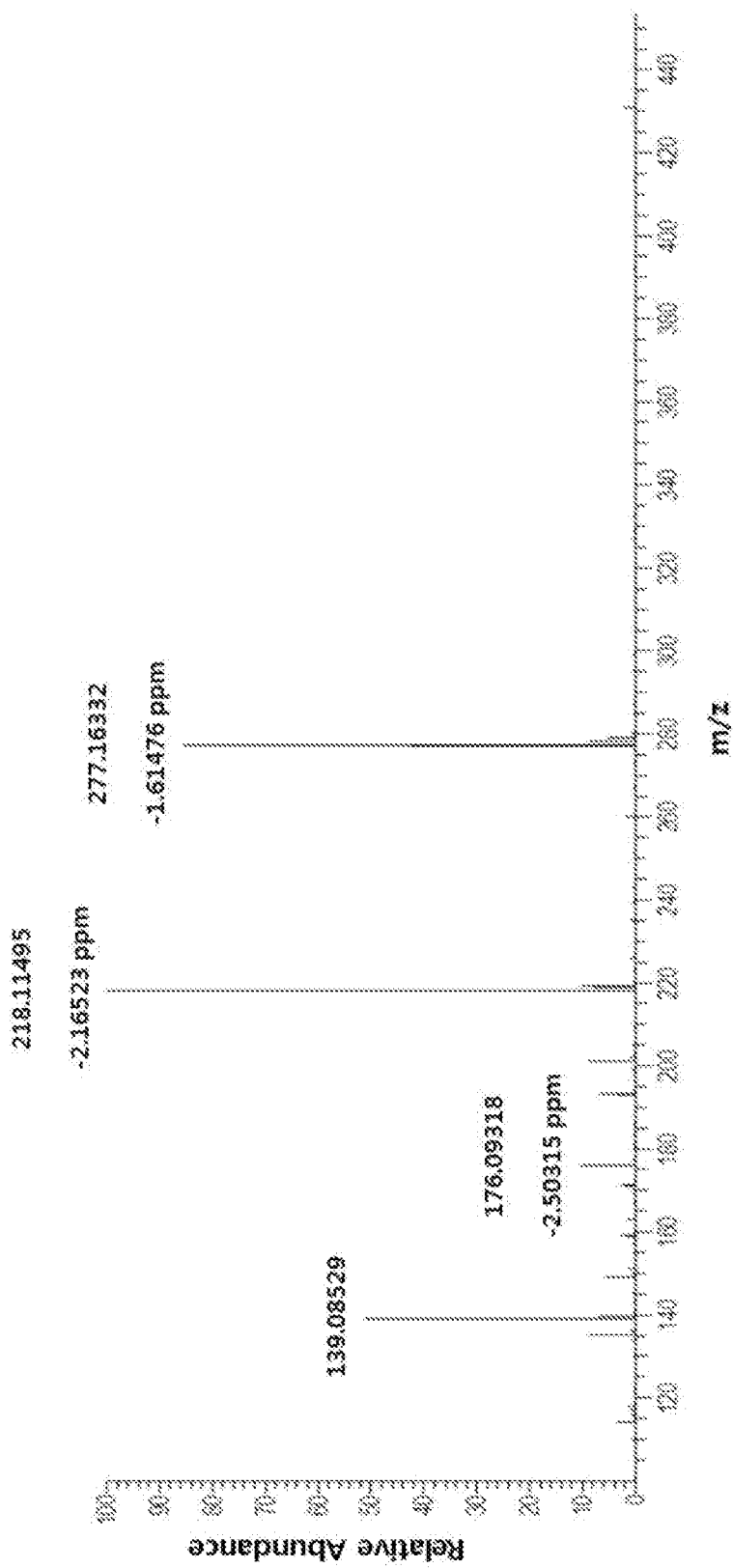
[Figure 3]

[Figure 4]
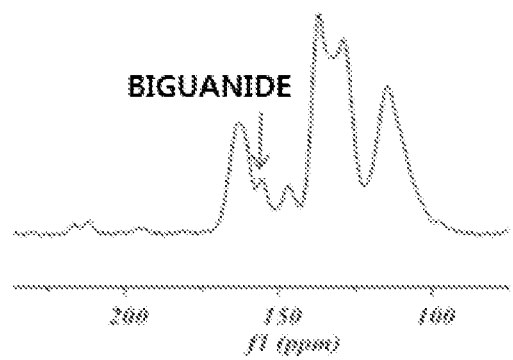
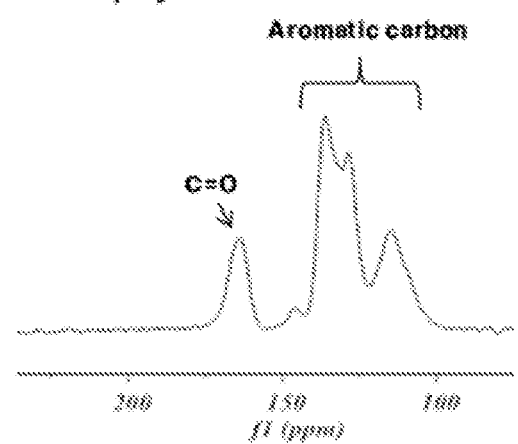

WATER TREATMENT MEMBRANE AND METHOD FOR MANUFACTURING SAME

RELATED APPLICATIONS

This application is a National Stage Application of International Application No. PCT/KR2018/004467 filed on Apr. 18, 2018, which claims priority to and the benefit of Korean Patent Application No. 10-2017-0050529 filed in the Korean Intellectual Property Office on Apr. 19, 2017, the entire contents of which are incorporated herein by reference.

TECHNICAL FIELD

The present specification relates to a water treatment membrane and a method for man ufacturing the same.

BACKGROUND ART

Developing a new source of water resources has emerged as an urgent problem due to recent serious pollution of water quality environments and water shortage. Studies on the pollution of water quality environments aim for high-quality residential and industrial water, and treatment of various domestic sewage and industrial wastewater, and interests in water treatment processes using a membrane having an advantage of energy saving have been rising. Further, accelerated reinforcement on environment regulations is expected to advance activation of membrane technologies. It is difficult for traditional water treatment processes to satisfy the tightened regulations, but membrane technologies secure excellent treatment efficiency and stable treatment and thus are expected to become a leading technology in the field of water treatment in the future.

Liquid separation is divided into micro filtration, ultra filtration, nano filtration, reverse osmosis, stannizing, active transport, electrodialysis, and the like, depending on the pore of the membrane. Among them, the reverse osmosis method refers to a process of performing desalination work by using a semi-permeable membrane which permeates water, but shows impermeability to salts, and when high pressure water in which salts are dissolved is introduced into one surface of the semi-permeable membrane, pure water from which salts have been removed is released into the other surface at low pressure.

Specifically, a representative example of the water treatment membrane is a polyamide-based water treatment membrane, and the polyamide-based water treatment membrane is manufactured by a method of forming a polysulfone layer on a non-woven fabric to form a microporous support, immersing the microporous support in an aqueous solution of m-phenylene diamine (mPD) to form an mPD layer, immersing the microporous support again in an organic solvent of trimesoyl chloride (TMC) or coating the microporous support with the organic solvent to bring the mPD layer into contact with TMC, and performing an interfacial polymerization to form a polyamide active layer.

Studies have been continuously conducted on increasing the salt rejection or flux of the polyamide-based composite membrane.

REFERENCES OF THE RELATED ART

Patent Document

Japanese Patent Application Laid-Open No. 2015-231624

DISCLOSURE

Technical Problem

The present specification has been made in an effort to provide a water treatment membrane having an improved filtration performance, and a method for manufacturing the same.

Technical Solution

An exemplary embodiment of the present specification provides a water treatment membrane including:

a porous support; and a polyamide active layer provided on the porous support, in which the polyamide active layer includes one or more units selected from among a unit of the following Chemical Formula 1, a unit of the following Chemical Formula 2, a unit of the following Chemical Formula 3, and a unit of the following Chemical Formula 4:

[Chemical Formula 1]

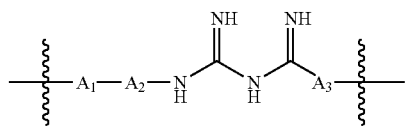

[Chemical Formula 2]

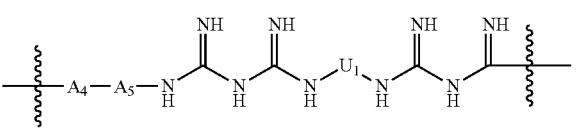

[Chemical Formula 3]

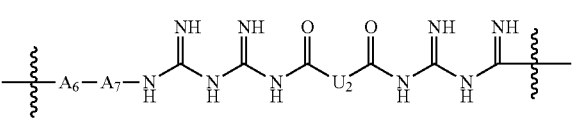

[Chemical Formula 4]

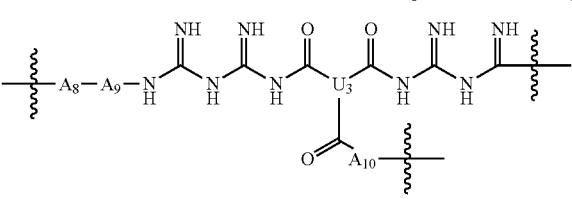

In Chemical Formulae 1 to 4, $U_1$ and $U_2$ are the same as or different from each other, and are each independently a substituted or unsubstituted divalent aliphatic group, a substituted or unsubstituted divalent alicyclic group, or a substituted or unsubstituted divalent aromatic group;

$U_3$ is a substituted or unsubstituted trivalent aliphatic group, a substituted or unsubstituted trivalent alicyclic group, or a substituted or unsubstituted trivalent aromatic group;

$A_1$ to $A_9$ are the same as or different from each other, and are each independently selected from among the following Chemical Formulae 5 to 7;

$A_{10}$ is one of the following Chemical Formula 5 or 8;

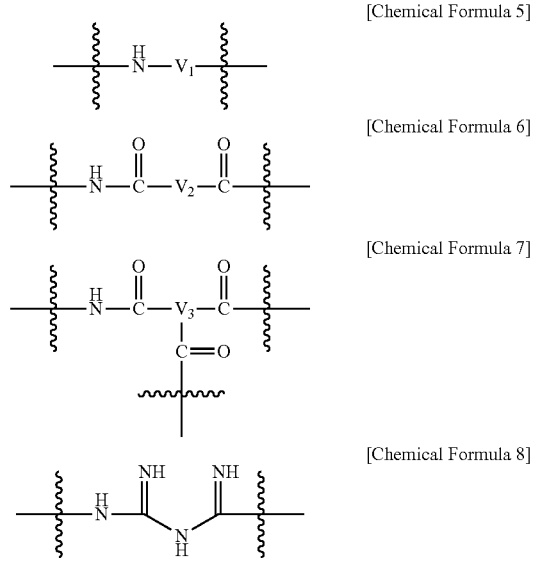

[Chemical Formula 5]

[Chemical Formula 6]

[Chemical Formula 7]

[Chemical Formula 8]

wherein in Chemical Formulae 5 to 8;

$V_1$ and $V_2$ are the same as or different from each other, and are each independently a substituted or unsubstituted phenylene group;

$V_3$ is a substituted or unsubstituted trivalent benzene ring group; and provided that one of $A_1$ to $A_3$, one of $A_4$ and $A_5$, one of $A_6$ and $A_7$, and one of $A_8$ and $A_9$ is Chemical Formula 5.

Further, an exemplary embodiment of the present specification provides a water treatment membrane including: a porous support; and a polyamide active layer provided on the porous support, in which the water treatment membrane includes a peak of a benzene ring between 6.8 ppm and 7.8 ppm as a result of $^1$H-NMR analysis before and after being dissociated in an acid or a base.

In addition, an exemplary embodiment of the present specification provides a water treatment membrane including: a porous support; and a polyamide active layer provided on the porous support, in which the water treatment membrane includes peaks of a C=N bond and a N—C—N bond as a result of IR analysis before and after being dissociated in an acid or a base.

Furthermore, an exemplary embodiment of the present specification provides a water treatment membrane including: a porous support; and a polyamide active layer provided on the porous support, in which the water treatment membrane includes an m/z value of 277, 193, 178, 102, 85, or 60 as a result of MS analysis after being dissociated in an acid or a base.

Further, an exemplary embodiment of the present specification provides a method for manufacturing a water treatment membrane, the method including: preparing a porous support; and forming a polyamide active layer on the porous support, in which the forming of the polyamide active layer includes an interfacial polymerization using an aqueous solution including an amine-based compound and an organic solution including an acyl halide compound, at least one of the aqueous solution including the amine-based compound and the organic solution including the acyl halide compound includes one or more biguanidine compounds of the following Chemical Formula 9 or Chemical Formula 10, and the biguanidine compound forms a covalent bond with the amine-based compound or the acyl halide compound in the polyamide active layer:

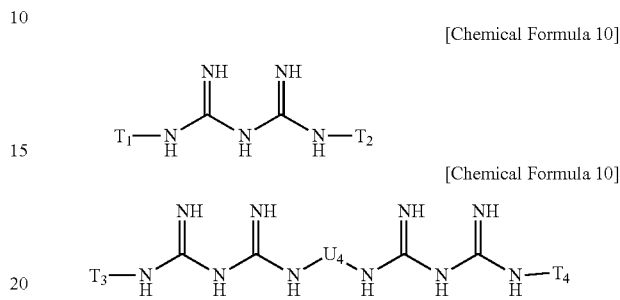

[Chemical Formula 10]

[Chemical Formula 10]

wherein in Chemical Formulae 9 and 10:

$U_4$ is a substituted or unsubstituted divalent aliphatic group, a substituted or unsubstituted divalent alicyclic group, or a substituted or unsubstituted divalent aromatic group; and $T_1$ to $T_4$ are the same as or different from each other, and are each independently hydrogen, deuterium, a nitrile group, a hydroxyl group, an acyl halide group, an isocyanate group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkylsulfoxy group, a substituted or unsubstituted arylsulfoxy group, a substituted or unsubstituted amine group, a substituted or unsubstituted alicyclic group, or a substituted or unsubstituted aromatic group.

Furthermore, an exemplary embodiment of the present specification provides a water treatment module including the above-described water treatment membrane.

Advantageous Effects

According to an exemplary embodiment of the present specification, a water treatment membrane having a polyamide active layer including one or more units selected from among a unit of Chemical Formula 1, a unit of Chemical Formula 2, a unit of Chemical Formula 3, and a unit of Chemical Formula 4 has an effect capable of improving salt rejection and/or flux characteristics, as compared to a water treatment membrane manufactured by an existing method.

Further, according to an exemplary embodiment of the present specification, a water treatment membrane including a polyamide active layer formed by an interfacial polymerization of an aqueous solution including an amine-based compound and/or an organic solution including an acyl halide compound, which include one or more biguanidine compounds of Chemical Formula 9 or Chemical Formula 10, has an effect capable of improving salt rejection and/or flux characteristics, as compared to a water treatment membrane manufactured by an existing method.

DESCRIPTION OF DRAWINGS

FIG. 1 is a view illustrating a water treatment membrane according to an exemplary embodiment of the present specification.

FIG. 2 is a view illustrating a $^1$H-NMR spectrum of the water treatment membrane according to an exemplary embodiment of the present specification before and after being dissociated in an acid or a base.

FIG. 3 is a view illustrating an ESI-MS spectrum of the water treatment membrane according to an exemplary embodiment of the present specification after being dissociated in an acid or a base.

FIG. 4 is a view illustrating $^{13}$C-NMR analysis results of Compound A and a PHB polymer.

MODE FOR INVENTION

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

A water treatment membrane according to an exemplary embodiment of the present specification can include: a porous support; and a polyamide active layer provided on the porous support, in which the polyamide active layer can include one or more units selected from among a unit of the following Chemical Formula 1, a unit of the following Chemical Formula 2, a unit of the following Chemical Formula 3, and a unit of the following Chemical Formula 4:

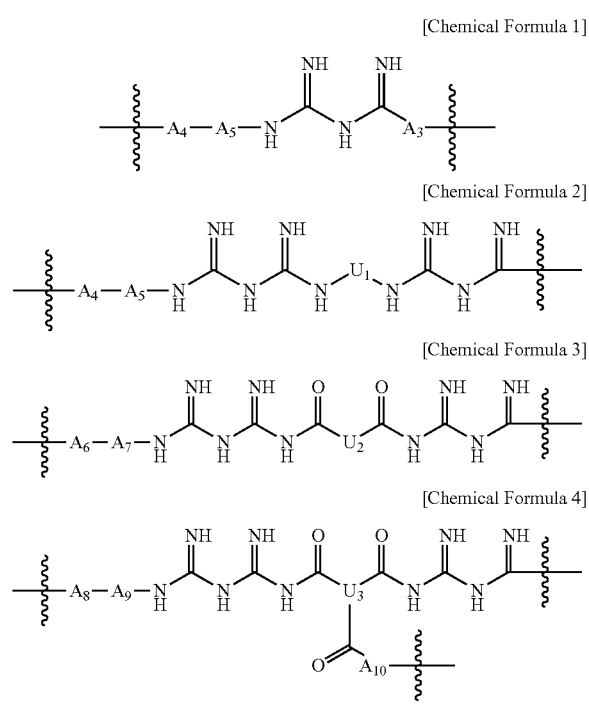

wherein in Chemical Formulae 1 to 4:

$U_1$ and $U_2$ are the same as or different from each other, and are each independently a substituted or unsubstituted divalent aliphatic group, a substituted or unsubstituted divalent alicyclic group, or a substituted or unsubstituted divalent aromatic group;

$U_3$ is a substituted or unsubstituted trivalent aliphatic group, a substituted or unsubstituted trivalent alicyclic group, or a substituted or unsubstituted trivalent aromatic group;

$A_1$ to $A_9$ are the same as or different from each other, and are each independently any one selected from among the following Chemical Formulae 5 to 7, $A_{10}$ is any one of the following Chemical Formula 5 or 8:

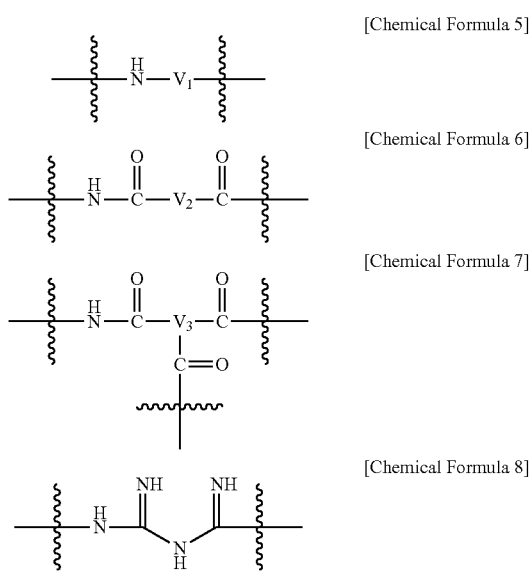

wherein in Chemical Formulae 5 to 8:

$V_1$ and $V_2$ are the same as or different from each other, and are each independently a substituted or unsubstituted phenylene group;

$V_3$ is a substituted or unsubstituted trivalent benzene ring group; and provided that one of $A_1$ to $A_3$, one of $A_4$ and $A_5$, one of $A_6$ and $A_7$, and one of $A_8$ and $A_9$ are Chemical Formula 5.

Typically, a water treatment membrane manufactured by adding a biguanidine compound as an additive does not have any analysis result in which the corresponding functional group is introduced into the main chain thereof as a covalent bond, and when a biguanidine group is used as an additive, there is a disadvantage in that it is not possible to confirm whether the biguanidine compound is present inside a polyamide active layer or washed away. However, the water treatment membrane according to an exemplary embodiment of the present specification is a water treatment membrane in which the biguanidine compound is present as a covalent bond in the polyamide active layer, and it is possible to confirm the fact through an analysis result described in the present Example.

According to an exemplary embodiment of the present specification, the polyamide active layer includes a biguanidine compound including three or more nitrogen atoms, and both ends of the biguanidine compound are bonded to the main chain thereof by forming a covalent bond with an amine-based compound or an acyl halide compound in the polyamide active layer. As a result, it is possible to exhibit high salt rejection, as compared to a membrane including the biguanidine compound as an additive of the polyamide active layer, or a membrane which does not include the biguanidine compound.

Specifically, when the biguanidine compound is included as an additive, a specific functional group perfectly exhibits an activity in a state where the biguanidine compound is embedded in the polyamide active layer, and in this case, the biguanidine compound in the polyamide active layer can be structurally shielded by another monomer or polymer. However, according to an exemplary embodiment of the present specification, when the biguanidine compound is stably present in the polyamide active layer through a covalent bond with an amine-based compound or an acyl halide compound, high salt rejection and boron rejection can be maintained regardless of driving time and condition. Further, a free volume of the water treatment membrane is increased due to the formation of the covalent bond, and as a result, a flux increasing effect is also exhibited. The flux increasing effect due to an increase in free volume is an effect which does not occur when biguanidine is introduced as an additive, and when biguanidine is introduced as an additive, it is possible to experimentally confirm that the flux rather drops.

According to another exemplary embodiment of the present specification, a water treatment membrane including: a porous support; and a polyamide active layer provided on the porous support can include a peak of a benzene ring between 6.8 ppm and 7.8 ppm as a result of $^1$H-NMR analysis before and after being dissociated in an acid or a base.

Specifically, the water treatment membrane can include four peaks of the benzene ring between 6.8 ppm and 7.8 ppm.

The water treatment membrane including the polyamide active layer in the related art cannot obtain the aforementioned peak as a result of $^1$H-NMR analysis, but the above-described water treatment membrane including a polyamide active layer including one or more units selected from among a unit of Chemical Formula 1, a unit of Chemical Formula 2, a unit of Chemical Formula 3, and a unit of Chemical Formula 4 can include the peak of the benzene ring between 6.8 ppm and 7.8 ppm as a result of $^1$H-NMR analysis, and can include the peak of the benzene ring between 6.8 ppm and 7.8 ppm as a result of $^1$H-NMR analysis identically before the dissociation and after being dissociated in an acid or a base.

In the present specification, the $^1$H-NMR analysis was carried out at room temperature by using an NMR spectrometer including a Varian Unity Inova (500 MHZ) spectrometer equipped with a triple resonance 5 mm probe. A material to be analyzed was used by being diluted at a concentration of about 10 mg/ml in a solvent ($D_2O$) for NMR measurement.

In the present specification, the $^{13}$C-NMR analysis was carried out at room temperature by using an NMR spectrometer including a Varian Unity Inova (500 MHZ) spectrometer equipped with a triple resonance 5 mm probe. A material to be analyzed was used by being diluted at a concentration of about 10 mg/ml in a solvent ($D_2O$) for NMR measurement. That is, the $^{13}$C-NMR analysis was measured with an instrument which is the same as the $^1$H-NMR analysis device, and was measured by differently setting only the pulse sequences during the measurement.

According to still another exemplary embodiment of the present specification, provided is a water treatment membrane including: a porous support; and a polyamide active layer provided on the porous support can include peaks of C=N bond and N—C—N bond as a result of IR analysis before and after being dissociated in an acid or a base.

In the present specification, for the IR analysis, the spectrum was measured through an ATR mode using FT-IR spectroscopy. Two methods including a method for measuring the surface of the membrane and a method for measuring the spectrum by mixing a film, which is dried after being dissociated in an acid or a base, with KBr were carried out.

In the case of a water treatment membrane into which a biguanidine compound is introduced as an additive, when the surface of the membrane is measured, C=N and N—C—N peaks can appear due to a biguanidine group embedded in the water treatment membrane, but when dissociated in an acid or a base, the biguanidine compound is dissociated, and as a result, the peaks disappear. However, in the water treatment membrane according to an exemplary embodiment of the present specification, the biguanidine compound is covalently bonded in the polyamide active layer, so that only the covalently bonded biguanidine remains in the polyamide active layer even after being dissociated in an acid or a base, and as a result, C=N and N—C—N peaks appear.

A water treatment membrane according to an exemplary embodiment of the present specification can include: a porous support; and a polyamide active layer provided on the porous support, and the polyamide active layer can include one or more units selected from among the unit of Chemical Formula 1, the unit of Chemical Formula 2, the unit of Chemical Formula 3, and the unit of Chemical Formula 4, and can include a peak of a benzene ring between 6.8 ppm and 7.8 ppm as a result of $^1$H-NMR analysis before and after being dissociated in an acid or a base.

A water treatment membrane according to an exemplary embodiment of the present specification can include: a porous support; and a polyamide active layer provided on the porous support, and the polyamide active layer can include one or more units selected from among the unit of Chemical Formula 1, the unit of Chemical Formula 2, the unit of Chemical Formula 3, and the unit of Chemical Formula 4, and can include peaks of C=N bond and N—C—N bond as a result of IR analysis before and after being dissociated in an acid or a base.

A water treatment membrane according to an exemplary embodiment of the present specification can include: a porous support; and a polyamide active layer provided on the porous support, and the polyamide active layer can include a peak of a benzene ring between 6.8 ppm and 7.8 ppm as a result of $^1$H-NMR analysis before and after being dissociated in an acid or a base, and can include peaks of C=N bond and N—C—N bond as a result of IR analysis before and after being dissociated in an acid or a base.

A water treatment membrane according to an exemplary embodiment of the present specification can include: a porous support; and a polyamide active layer provided on the porous support, and the polyamide active layer can include one or more units selected from among the unit of Chemical Formula 1, the unit of Chemical Formula 2, the unit of Chemical Formula 3, and the unit of Chemical Formula 4, can include a peak of a benzene ring between 6.8 ppm and 7.8 ppm as a result of $^1$H-NMR analysis before and after being dissociated in an acid or a base, and can include peaks of C=N bond and N—C—N bond as a result of IR analysis before and after being dissociated in an acid or a base.

According to another exemplary embodiment of the present specification, provided is a water treatment membrane including: a porous support; and a polyamide active layer provided on the porous support that can include an m/z value of 277, 193, 178, 102, 85, and/or 60 as a result of MS analysis after being dissociated in an acid or a base.

For example, the m/z value is a value obtained by calculating the molecular weight (m/z) of cleavage as a result of MS analysis of the water treatment membrane after the water treatment membrane is dissociated in an acid or a base when two biguanidine groups are bonded, as a covalent bond, to both ends of mPD as an amine compound included in the polyamide active layer according to an exemplary embodiment of the present specification.

In the present specification, for the MS analysis, an LC/MS analysis was carried out at 40° C. with C18 columns by using an ESI positive ionization method.

A water treatment membrane according to an exemplary embodiment of the present specification can include: a porous support; and a polyamide active layer provided on the porous support, and the polyamide active layer can include one or more units selected from among the unit of Chemical Formula 1, the unit of Chemical Formula 2, the unit of Chemical Formula 3, and the unit of Chemical Formula 4, and can include an m/z value of 277, 193, 178, 102, 85, and/or 60 as a result of MS analysis after being dissociated in an acid or a base.

A water treatment membrane according to an exemplary embodiment of the present specification can include: a porous support; and a polyamide active layer provided on the porous support, and the polyamide active layer can include a peak of a benzene ring between 6.8 ppm and 7.8 ppm as a result of $^1$H-NMR analysis before and after being dissociated in an acid or a base, and can include an m/z value of 277, 193, 178, 102, 85, and/or 60 as a result of MS analysis after being dissociated in an acid or a base.

A water treatment membrane according to an exemplary embodiment of the present specification can include: a porous support; and a polyamide active layer provided on the porous support, and the polyamide active layer includes one or more units selected from among the unit of Chemical Formula 1, the unit of Chemical Formula 2, the unit of Chemical Formula 3, and the unit of Chemical Formula 4, and can include a peak of a benzene ring between 6.8 ppm and 7.8 ppm as a result of $^1$H-NMR analysis before and after being dissociated in an acid or a base, and can include an m/z value of 277, 193, 178, 102, 85, and/or 60 as a result of MS analysis after being dissociated in an acid or a base.

A water treatment membrane according to an exemplary embodiment of the present specification can include a porous support; and a polyamide active layer provided on the porous support, can include an m/z value of 277, 193, 178, 102, 85, and/or 60 as a result of MS analysis after being dissociated in an acid or a base, and can include peaks of C=N bond and N—C—N bond as a result of IR analysis before and after being dissociated in an acid or a base.

A water treatment membrane according to an exemplary embodiment of the present specification can include: a porous support; and a polyamide active layer provided on the porous support, and the polyamide active layer can include one or more units selected from among the unit of Chemical Formula 1, the unit of Chemical Formula 2, the unit represented by of Chemical Formula 3, and the unit represented by of Chemical Formula 4, can include an m/z value of 277, 193, 178, 102, 85, and/or 60 as a result of MS analysis after being dissociated in an acid or a base, and can include peaks of C=N bond and N—C—N bond as a result of IR analysis before and after being dissociated in an acid or a base.

A water treatment membrane according to an exemplary embodiment of the present specification can include: a porous support; and a polyamide active layer provided on the porous support, and the polyamide active layer can include a peak of a benzene ring between 6.8 ppm and 7.8 ppm as a result of $^1$H-NMR analysis before and after being dissociated in an acid or a base, can include an m/z value of 277, 193, 178, 102, 85, and/or 60 as a result of MS analysis after being dissociated in an acid or a base, and can include peaks of C=N bond and N—C—N bond as a result of IR analysis before and after being dissociated in an acid or a base.

A water treatment membrane according to an exemplary embodiment of the present specification can include: a porous support; and a polyamide active layer provided on the porous support, and the polyamide active layer can include one or more units selected from among the unit of Chemical Formula 1, the unit of Chemical Formula 2, the unit of Chemical Formula 3, and the unit of Chemical Formula 4, and can include a peak of a benzene ring between 6.8 ppm and 7.8 ppm as a result of 1H-NMR analysis before and after being dissociated in an acid or a base, and can include an m/z value of 277, 193, 178, 102, 85, and/or 60 as a result of MS analysis after being dissociated in an acid or a base, and can include peaks of C=N bond and N—C—N bond as a result of IR analysis before and after being dissociated in an acid or a base.

In the present specification, when the water treatment membrane is dissociated in the acid or the base, the acid can be hydrochloric acid, nitric acid, sulfuric acid, or the like, the base can be sodium hydroxide, potassium hydroxide, or the like, and the acid and the base are not limited thereto.

In the present specification, the term "substitution" means that a hydrogen atom bonded to a carbon atom of a compound is changed into another substituent, and a position to be substituted is not limited as long as the position is a position at which the hydrogen atom is substituted, that is, a position at which the substituent can be substituted, and when two or more substituents are substituted, the two or more substituents can be the same as or different from each other.

In the present specification, the term "substituted or unsubstituted" means being substituted with one or two or more substituents selected from the group consisting of deuterium, a halogen group, a nitrile group, a hydroxyl group, an alkyl group, a cycloalkyl group, an alkenyl group, an alkoxy group, an amine group, an arylamine group, an aryl group, and a heterocyclic group including one or more of N, O, S, Se, and Si atoms, being substituted with a substituent to which two or more substituents among the substituents exemplified are linked, or having no substituent.

In the present specification, examples of a halogen group include fluoro, chlorine, bromine, and iodine.

In the present specification, an aliphatic group is an alkyl group, an alkenyl group, or an alkynyl group, an alicyclic group is a cycloalkyl group, or an aliphatic heterocyclic group including one or more of N, O, and S, and an aromatic group is an aryl group, or a heteroaryl group.

In the present specification, an alkyl group can be straight-chained or branched, and the number of carbon atoms thereof is not particularly limited, but is preferably 1 to 30. Specifically, the number of carbon atoms thereof is preferably 1 to 20. More specifically, the number of carbon atoms thereof is preferably 1 to 10. Specific examples thereof include methyl, ethyl, propyl, n-propyl, isopropyl, butyl, n-butyl, isobutyl, tert-butyl, sec-butyl, 1-methyl-butyl, 1-ethylbutyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethylpropyl, 1,1-dimethylpropyl, isohexyl, 2-methylpentyl, 4-methylhexyl, 5-methylhexyl, and the like, but are not limited thereto.

In the present specification, a cycloalkyl group is not particularly limited, but has preferably 3 to 30 carbon atoms, and more preferably 3 to 20 carbon atoms. Specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present specification, an alkoxy group can be straight-chained, branched, or cyclic. The number of carbon atoms of the alkoxy group is not particularly limited, but is preferably 1 to 30. Specifically, the number of carbon atoms thereof is preferably 1 to 20. More specifically, the number of carbon atoms thereof is preferably 1 to 10. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, an amine group can be selected from the group consisting of —NH$_2$, an alkylamine group, an N-alkylarylamine group, an arylamine group, an N-arylheteroarylamine group, an N-alkylheteroarylamine group, and a heteroarylamine group, and the number of carbon atoms thereof is not particularly limited, but is preferably 1 to 30. Specific examples of the amine group include a methylamine group, a dimethylamine group, an ethylamine group, a diethylamine group, a phenylamine group, a naphthylamine group, a biphenylamine group, an anthracenylamine group, a 9-methylanthracenylamine group, a diphenylamine group, an N-phenylnaphthylamine group, a ditolylamine group, an N-phenyltolylamine group, a triphenylamine group, an N-phenylbiphenylamine group, an N-phenylnaphthylamine group, an N-biphenylnaphthylamine group, an N-naphthylfluorenylamine group, an N-phenylphenanthrenylamine group, an N-biphenylphenanthrenylamine group, an N-phenylfluorenylamine group, an N-phenyl terphenylamine group, an N-phenanthrenylfluorenylamine group, an N-biphenylfluorenylamine group, and the like, but are not limited thereto.

In the present specification, the alkyl group in the alkylamine group, the N-arylalkylamine group, the alkylthioxy group, the alkylsulfoxy group, and the N-alkylheteroarylamine group is the same as the above-described examples of the alkyl group. Specifically, examples of the alkylthioxy group include a methylthioxy group, an ethylthioxy group, a tert-butylthioxy group, a hexylthioxy group, an octylthioxy group, and the like, and examples of the alkylsulfoxy group include mesyl, an ethylsulfoxy group, a propylsulfoxy group, a butylsulfoxy group, and the like, but the examples are not limited thereto.

In the present specification, an alkenyl group can be straight-chained or branched, and the number of carbon atoms thereof is not particularly limited, but is preferably 2 to 30, and more specifically, the number of carbon atoms thereof is preferably 2 to 20. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, an aryl group is not particularly limited, but has preferably 6 to 30 carbon atoms, and more preferably 6 to 20 carbon atoms. The aryl group can be monocyclic or polycyclic. When the aryl group is a monocyclic aryl group, the number of carbon atoms thereof is not particularly limited, but is preferably 6 to 30. Specific examples of the monocyclic aryl group include a phenyl group, a biphenyl group, a terphenyl group, and the like, but are not limited thereto. When the aryl group is a polycyclic aryl group, the number of carbon atoms thereof is not particularly limited, but is preferably 10 to 30. Specific examples of the polycyclic aryl group include a naphthyl group, an anthracenyl group, a phenanthryl group, a triphenyl group, a pyrenyl group, a phenalenyl group, a perylenyl group, a chrysenyl group, a fluorenyl group, and the like, but are not limited thereto.

In the present specification, the aryl group in the aryloxy group, the arylthioxy group, the N-arylalkylamine group, and the N-arylheteroarylamine group is the same as the above-described examples of the aryl group. Specifically, examples of the aryloxy group include a phenoxy group, a p-tolyloxy group, an m-tolyloxy group, a 3,5-dimethylphenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group, and the like, examples of the arylthioxy group include a phenylthioxy group, a 2-methylphenylthioxy group, a 4-tert-butylphenylthioxy group, and the like, and examples of the arylsulfoxy group include a benzenesulfoxy group, a p-toluenesulfoxy group, and the like, but the examples are not limited thereto.

In the present specification, a heteroaryl group includes one or more atoms other than carbon, that is, one or more heteroatoms, and specifically, the heteroatom can include one or more atoms selected from the group consisting of O, N, S, and the like. The number of carbon atoms thereof is not particularly limited, but is preferably 2 to 30, and more preferably 2 to 20, and the heteroaryl group can be monocyclic or polycyclic. Examples of the heteroaryl group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), an isoxazolyl group, a thiadiazolyl group, a phenothiazinyl group, a dibenzofuranyl group, and the like, but are not limited thereto.

In the present specification, an alkylene group means a group having two bonding positions in an alkyl group, that is, a divalent group. The above-described description on the alkyl group can be applied to the alkylene group, except for a divalent alkylene group.

In the present specification, an arylene group means that there are two bonding positions in an aryl group, that is, a divalent group. The above-described description of the aryl group can be applied to the arylene group, except for a divalent arylene group.

In the present specification, an aliphatic heterocyclic group includes one or more atoms other than carbon, that is, one or more heteroatoms, and specifically, the heteroatom aliphatic heterocyclic group can be a cyclic alkyl group including one or more atoms selected from the group consisting of O, N, S, and the like. The number of carbon atoms thereof is not particularly limited, but is preferably 2 to 30, more preferably 2 to 20, and even more preferably 2 to 10, and the aromatic aliphatic heterocyclic group can be monocyclic or polycyclic. Specific examples thereof include an epoxide group, an aziridine group, and the like, but are not limited thereto.

According to an exemplary embodiment of the present specification, $U_1$ and $U_2$ are the same as or different from each other, and are each independently a substituted or unsubstituted alkylene group, a substituted or unsubstituted divalent alkenyl group, a substituted or unsubstituted divalent cycloalkyl group, a substituted or unsubstituted divalent aliphatic heterocyclic group, or a substituted or unsubstituted arylene group.

According to an exemplary embodiment of the present specification, $U_1$ and $U_2$ are the same as or different from each other, and are each independently a substituted or unsubstituted alkylene group having 1 to 10 carbon atoms, or a substituted or unsubstituted arylene group having 6 to 20 carbon atoms. The alkylene group can be a methylene group, an ethylene group, a propylene group, a butylene group, a pentylene group, a hexylene group, a heptylene group, an octylene group, a nonanylene group, a decanylene group, or the like, the arylene group can be a phenylene group, a biphenylene group, a naphthylene group, an anthracenylene group, a phenanthrenylene group, a perylenylene group, a fluoranthenylene group, a triphenylenylene group, a pyrenylene group, a fluorenylene group, or the like, but these groups are not limited thereto.

According to an exemplary embodiment of the present specification, $U_1$ and $U_2$ are the same as or different from each other, and are each independently an alkylene group which is unsubstituted or substituted with a hydroxyl group, a halogen group, or an amine group, or an arylene group which is unsubstituted or substituted with a hydroxyl group, a halogen group, or an amine group.

According to an exemplary embodiment of the present specification, $U_1$ and $U_2$ are the same as or different from each other, and are each independently a substituted or unsubstituted arylene group.

According to an exemplary embodiment of the present specification, $U_1$ and $U_2$ are the same as or different from each other, and are each independently an arylene group which is unsubstituted or substituted with a hydroxyl group, a halogen group, or an amine group.

According to an exemplary embodiment of the present specification, $U_1$ and $U_2$ are the same as or different from each other, and are each independently a substituted or unsubstituted phenylene group.

According to an exemplary embodiment of the present specification, $U_1$ and $U_2$ are the same as or different from each other, and are each independently a phenylene group which is unsubstituted or substituted with a hydroxyl group, a halogen group, or an amine group.

According to an exemplary embodiment of the present specification, $U_1$ and $U_2$ are the same as or different from each other, and are each independently a phenylene group which is unsubstituted or substituted with a hydroxyl group, a fluoro group, or an amine group.

According to an exemplary embodiment of the present specification, $U_3$ is a substituted or unsubstituted trivalent alkyl group, a substituted or unsubstituted trivalent cycloalkyl group, a substituted or unsubstituted trivalent aliphatic heterocyclic group, or a substituted or unsubstituted trivalent aryl group.

According to an exemplary embodiment of the present specification, $U_3$ is a substituted or unsubstituted trivalent aryl group.

According to an exemplary embodiment of the present specification, $U_3$ is a substituted or unsubstituted trivalent phenyl group.

According to an exemplary embodiment of the present specification, $U_3$ is a trivalent benzene ring group.

According to an exemplary embodiment of the present specification, $V_1$ and $V_2$ are the same as or different from each other, and are each independently a substituted or unsubstituted phenylene group.

According to an exemplary embodiment of the present specification, $V_1$ and $V_2$ are the same as or different from each other, and are each independently a phenylene group which is unsubstituted or substituted with a halogen group or an amine group.

According to an exemplary embodiment of the present specification, $V_1$ and $V_2$ are the same as or different from each other, and are each independently a phenylene group which is unsubstituted or substituted with a fluoro group or an amine group.

According to an exemplary embodiment of the present specification, $V_3$ is a substituted or unsubstituted trivalent benzene ring group.

According to an exemplary embodiment of the present specification, $V_3$ is a trivalent benzene ring group.

According to an exemplary embodiment of the present specification, Chemical Formula 2 can be any one of the following Chemical Formulae 2-1 to 2-6:

[Chemical Formula 2-1]

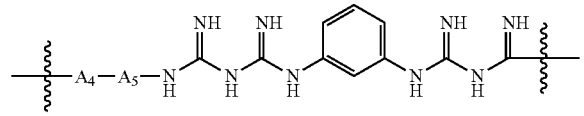

[Chemical Formula 2-2]

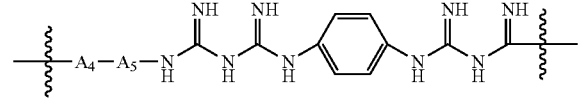

[Chemical Formula 2-3]

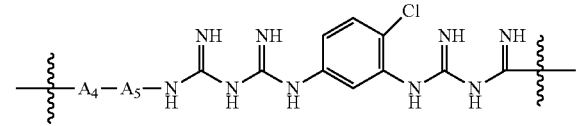

[Chemical Formula 2-4]

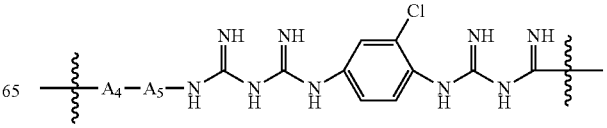

[Chemical Formula 2-5]

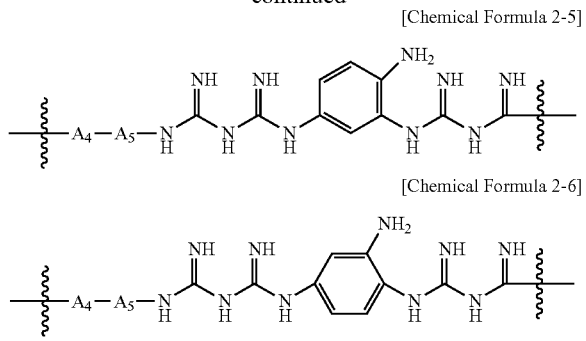

[Chemical Formula 2-6]

In Chemical Formulae 2-1 to 2-6, definitions of $A_4$ and $A_5$ are the same as those defined in Chemical Formula 2.

According to an exemplary embodiment of the present specification, Chemical Formula 3 can be the following Chemical Formula 3-1 or 3-2:

[Chemical Formula 3-1]

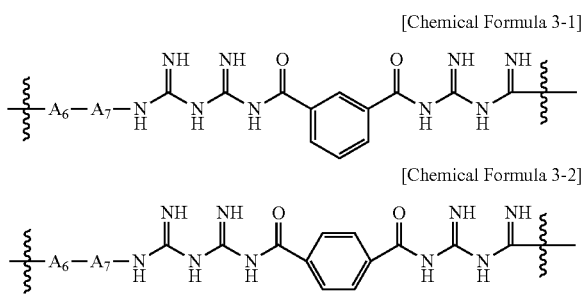

[Chemical Formula 3-2]

In Chemical Formulae 3-1 and 3-2, definitions of $A_6$ and $A_7$ are the same as those defined in Chemical Formula 3.

According to an exemplary embodiment of the present specification, Chemical Formula 4 can be the following Chemical Formula 4-1:

[Chemical Formula 4-1]

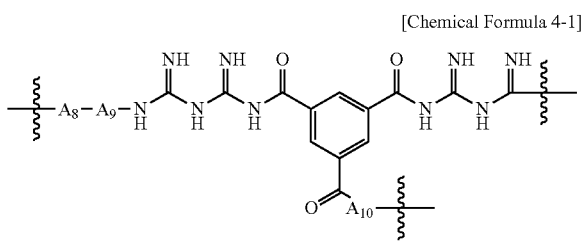

In Chemical Formula 4-1, definitions of $A_8$ to $A_{10}$ are the same as those defined in Chemical Formula 4.

According to an exemplary embodiment of the present specification, a content of one or more units selected from among the unit of Chemical Formula 1, the unit of Chemical Formula 2, the unit of Chemical Formula 3, and the unit of Chemical Formula 4 in the polyamide active layer can be 0.01 wt % to 10 wt %.

According to an exemplary embodiment of the present specification, one or more units selected from among the unit of Chemical Formula 1, the unit of Chemical Formula 2, the unit of Chemical Formula 3, and the unit of Chemical Formula 4 can form a copolymer.

According to an exemplary embodiment of the present specification, the copolymer including one or more units selected from among the unit of Chemical Formula 1, the unit of Chemical Formula 2, the unit of Chemical Formula 3, and the unit of Chemical Formula 4 has a weight average molecular weight of 100 g/mol to 1,200 g/mol, preferably 200 g/mol to 1,000 g/mol, and more preferably 400 g/mol to 950 g/mol.

According to an exemplary embodiment of the present specification, when the copolymer has a weight average molecular weight of 100 g/mol or more, there is an effect capable of preventing a phenomenon in which the salt rejection according to the period of time in which the membrane is used is reduced because the copolymer is gradually washed away without remaining in the film, and when the copolymer has a weight average molecular weight of 1,200 g/mol or less, there is an effect capable of preventing a phenomenon in which the copolymer is not dispersed in the aqueous solution due to a phenomenon in which the water solubility is reduced as the molecular weight is increased, and there is an effect capable of securing a suitable boron rejection because the copolymer remains in the active layer.

FIG. 1 illustrates a water treatment membrane according to an exemplary embodiment of the present specification. Specifically, FIG. 1 illustrates a water treatment membrane in which a non-woven fabric 100, a porous support 200, and a polyamide active layer 300 are sequentially provided, and saltwater 400 flows into the polyamide active layer 300, so that purified water 500 is released through the non-woven fabric 100, and concentrated water 600 is released to the outside without passing through the polyamide active layer 300. Here, one or more selected from among the unit represented by Chemical Formula 1, the unit represented by Chemical Formula 2, the unit represented by Chemical Formula 3, and the unit represented by Chemical Formula 4 according to the above-described exemplary embodiments are included in the polyamide active layer 300. However, the water treatment membrane according to an exemplary embodiment of the present specification is not limited to the structure in FIG. 1, and an additional configuration can be further included.

According to an exemplary embodiment of the present specification, a salt rejection of the water treatment membrane can be 97% or more, preferably 98% or more, more preferably 99% or more, even more preferably 99.80% or more, and still even more preferably 99.83% or more.

According to an exemplary embodiment of the present specification, a flux of the water treatment membrane can be 5 gfd or more and 20 gfd or less, preferably 10 gfd or more and 20 gfd or less, and more preferably 15 gfd or more and 20 gfd or less.

Further, according to an exemplary embodiment of the present specification, the water treatment membrane can have a thickness of 100 μm or more and 250 μm or less, and when the water treatment membrane has a thickness of 100 μm or more, there is an effect capable of preventing a phenomenon in which the flux and salt rejection of the membrane are reduced, and when the water treatment membrane has a thickness of 250 μm or less, there is an effect capable of preventing a phenomenon in which the salt rejection of the membrane is reduced.

According to an exemplary embodiment of the present specification, the porous support can have a thickness of 60 μm to 100 μm, but the thickness is not limited thereto, and can be adjusted, if necessary. Further, it is preferred that the porous support has a pore size of 1 nm to 500 nm, but the pore size is not limited thereto.

Furthermore, an exemplary embodiment of the present specification provides a method for manufacturing a water treatment membrane, the method including: preparing a porous support; and forming a polyamide active layer on the porous support, in which the forming of the polyamide active layer includes an interfacial polymerization using an aqueous solution including an amine-based compound and an organic solution including an acyl halide compound, and at least one of the aqueous solution including the amine-based compound and the organic solution including the acyl halide compound includes one or more biguanidine compounds of the following Chemical Formula 9 or Chemical Formula 10:

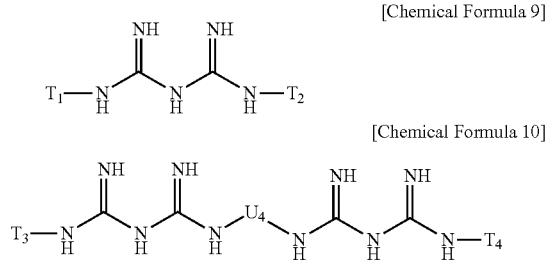

[Chemical Formula 9]

[Chemical Formula 10]

In Chemical Formulae 9 and 10, $U_4$ is a substituted or unsubstituted divalent aliphatic group, a substituted or unsubstituted divalent alicyclic group, or a substituted or unsubstituted divalent aromatic group, $T_1$ to $T_4$ are the same as or different from each other, and are each independently hydrogen, deuterium, a nitrile group, a hydroxyl group, an acyl halide group, an isocyanate group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkylsulfoxy group, a substituted or unsubstituted arylsulfoxy group, a substituted or unsubstituted amine group, a substituted or unsubstituted alicyclic group, or a substituted or unsubstituted aromatic group.

According to an exemplary embodiment of the present specification, $U_4$ is a substituted or unsubstituted alkylene group, a substituted or unsubstituted divalent alkenyl group, a substituted or unsubstituted divalent cycloalkyl group, or a substituted or unsubstituted arylene group.

According to an exemplary embodiment of the present specification, $U_4$ is a substituted or unsubstituted alkylene group having 1 to 10 carbon atoms, or a substituted or unsubstituted arylene group having 6 to 20 carbon atoms. The alkylene group can be a methylene group, an ethylene group, a propylene group, a butylene group, a pentylene group, a hexylene group, a heptylene group, an octylene group, a nonanylene group, a decanylene group, or the like, the arylene group can be a phenylene group, a biphenylene group, a naphthylene group, an anthracenylene group, a phenanthrenylene group, a perylenylene group, a fluoranthenylene group, a triphenylenylene group, a pyrenylene group, a fluorenylene group, or the like, but these groups are not limited thereto.

According to an exemplary embodiment of the present specification, $U_4$ is an alkylene group which is unsubstituted or substituted with a hydroxyl group, an acyl halide group, a halogen group, or an amine group, or an arylene group which is unsubstituted or substituted with a hydroxyl group, an acyl halide group, a halogen group, or an amine group.

According to an exemplary embodiment of the present specification, $U_4$ is a substituted or unsubstituted arylene group.

According to an exemplary embodiment of the present specification, $U_4$ is an arylene group which is unsubstituted or substituted with a hydroxyl group, an acyl halide group, a halogen group, or an amine group.

According to an exemplary embodiment of the present specification, $U_4$ is a substituted or unsubstituted phenylene group.

According to an exemplary embodiment of the present specification, $U_4$ is a phenylene group which is unsubstituted or substituted with a hydroxyl group, an acyl halide group, a halogen group, or an amine group.

According to an exemplary embodiment of the present specification, $U_4$ is a phenylene group which is unsubstituted or substituted with a hydroxyl group, an acyl halide group, a flouro group, or an amine group.

According to an exemplary embodiment of the present specification, $T_1$ to $T_4$ are the same as or different from each other, and are each independently hydrogen, deuterium, a nitrile group, a hydroxyl group, an acyl halide group, an isocyanate group, a substituted or unsubstituted alkoxy group, a substituted or unsubstituted aryloxy group, a substituted or unsubstituted alkylthioxy group, a substituted or unsubstituted arylthioxy group, a substituted or unsubstituted alkyl sulfoxy group, a substituted or unsubstituted arylsulfoxy group, a substituted or unsubstituted amine group, a substituted or unsubstituted cycloalkyl group, a substituted or unsubstituted aliphatic heterocyclic group, a substituted or unsubstituted aryl group, or a substituted or unsubstituted heteroaryl group.

According to an exemplary embodiment of the present specification, $T_1$ to $T_4$ are the same as or different from each other, and are each independently hydrogen, deuterium, a nitrile group, a hydroxyl group, an acyl halide group, an isocyanate group, an alkoxy group, an aryloxy group, an alkylthioxy group, an arylthioxy group, an alkylsulfoxy group, an arylsulfoxy group, an amine group, an arylamine group, a heteroarylamine group, an aliphatic heterocyclic group including one or more of N, O, and S, an aryl group, or a heteroaryl group.

According to an exemplary embodiment of the present specification, $T_1$ to $T_4$ are the same as or different from each other, and are each independently an aryl group which is unsubstituted or substituted with one or more selected from the group consisting of a nitrile group, a halogen group, a hydroxyl group, an acyl halide group, an isocyanate group, an alkoxy group, an aryloxy group, an alkylthioxy group, an arylthioxy group, an alkylsulfoxy group, an arylsulfoxy group, and an amine group.

According to an exemplary embodiment of the present specification, $T_1$ to $T_4$ are the same as or different from each other, and are each independently an aryl group having 6 to 20 carbon atoms, which is unsubstituted or substituted with one or more selected from the group consisting of a nitrile group, a halogen group, a hydroxyl group, an acyl halide group, an isocyanate group, an alkoxy group, an aryloxy group, an alkylthioxy group, an arylthioxy group, an alkylsulfoxy group, an arylsulfoxy group, and an amine group, and the aryl group can be a phenyl group, a biphenyl group, a naphthyl group, an anthracenyl group, a phenanthrenyl group, a perylenyl group, a fluoranthenyl group, a triphenylenyl group, a pyrenyl group, or a fluorenyl group, but is not limited thereto.

According to an exemplary embodiment of the present specification, $T_1$ to $T_4$ are the same as or different from each other, and are each independently a phenyl group which is unsubstituted or substituted with one or more selected from the group consisting of a nitrile group, a halogen group, a hydroxyl group, an acyl halide group, an isocyanate group, an alkoxy group, an aryloxy group, an alkylthioxy group, an arylthioxy group, an alkylsulfoxy group, an arylsulfoxy group, and an amine group.

According to an exemplary embodiment of the present specification, $T_1$ to $T_4$ are an amino group ($-NH_2$).

According to an exemplary embodiment of the present specification, Chemical Formula 9 can be the following Chemical Formula 9-1, and Chemical Formula 10 can be the following Chemical Formula 10-1:

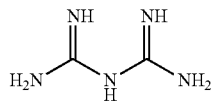

[Chemical Formula 9-1]

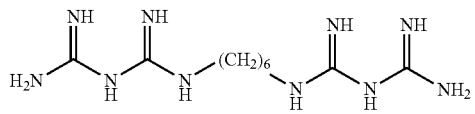

[Chemical Formula 10-1]

According to an exemplary embodiment of the present specification, the polyamide active layer can be formed through forming an aqueous solution layer including an amine-based compound on a porous support, and forming a polyamide active layer by bringing an organic solution including an acyl halide compound into contact with the aqueous solution layer including the amine-based compound. In this case, at least one of the aqueous solution including the amine-based compound and the organic solution including the acyl halide compound includes the one or more biguanidine compounds of Chemical Formula 9 or 10.

According to an exemplary embodiment of the present specification, the one or more biguanidine compounds of Chemical Formula 9 or 10 can be included in a content of 0.01 wt % to 10 wt % in the aqueous solution including the amine-based compound or the organic solution including the acyl halide compound. Preferably, the one or more biguanidine compounds can be included in a content of 2 wt % to 10 wt %. When the aforementioned range is satisfied, the biguanidine compound present in the water treatment membrane remains without being washed away due to a covalent bond with the amine-based compound or the acyl halide compound, and as a result, salt rejection and boron rejection are maintained, and a flux increasing effect is also exhibited due to an increase in free volume of the water treatment membrane caused by the formation of covalent bond.

According to an exemplary embodiment of the present specification, when the content of the biguanidine compound of Chemical Formula 9 or 10 in the aqueous solution or the organic solution is less than 0.01 wt %, a phenomenon in which a salt rejection of the water treatment membrane is reduced cannot be prevented because an appropriate content of the copolymer in the polyamide active layer fails to be secured, and when the content thereof is more than 10 wt %, the function of the membrane fails to be secured because the flux is reduced in spite of a high salt rejection. In particular, when the content thereof is 10 wt % or less, an opaque state with respect to the aqueous solution or the organic solution is formed, so that precipitation occurs, and as a result, there is an effect capable of preventing a problem of contaminating a membrane manufacturing facility.

According to an exemplary embodiment of the present specification, the forming of the aqueous solution layer including the amine-based compound is not particularly limited, and a method can be used without limitation as long as the method can form an aqueous solution layer on a porous support. Specifically, examples of the method of forming the aqueous solution layer including the amine-based compound on the porous support include spraying, application, dipping, dropwise addition, and the like.

According to an exemplary embodiment of the present specification, when the aqueous solution layer including the amine-based compound is brought into contact with the organic solution including the acyl halide compound, polyamide is produced by an interfacial polymerization while the amine compound and the acyl halide compound, which are coated on the surface of the membrane, react with each other, and the polyamide is adsorbed on the microporous support, so that a thin film is formed. Further, according to an exemplary embodiment of the present specification, an active layer can be formed through a method such as dipping, spraying, or coating.

According to an exemplary embodiment of the present specification, the aqueous solution layer can be additionally subjected to removing an excess aqueous solution including an amine-based compound, if necessary. The aqueous solution layer formed on the porous support can be non-uniformly distributed when the aqueous solution present on the porous support is present in an excessive amount, and when the aqueous solution is non-uniformly distributed, a non-uniform active layer can be formed by a subsequent interfacial polymerization. Accordingly, after the aqueous solution layer is formed on the support, it is preferred to remove an excess aqueous solution. The removal of the excess aqueous solution is not particularly limited, but can be performed by using, for example, a sponge, an air knife, a nitrogen gas blowing, natural drying, or a compression roll, and the like.

According to an exemplary embodiment of the present specification, as the porous support, it is possible to use a porous support in which a coating layer made of a polymer material is formed on a non-woven fabric. As the polymer material, it is possible to use, for example, polysulfone, polyethersulfone, polycarbonate, polyethylene oxide, polyimide, polyetherimide, polyether ether ketone, polypropylene, polymethylpentene, polymethyl chloride, polyvinylidene fluoride, or the like, but the polymer material is not limited thereto. Specifically, as the polymer material, polysulfone can be used.

According to an exemplary embodiment of the present specification, the method can include further applying an additive such as triethylammonium camphorsulfonate (TEACSA) before preparing a porous support and forming a polyamide active layer on the porous support, that is, applying an aqueous solution including an amine-based compound on the support.

According to an exemplary embodiment of the present specification, the amine-based compound in the aqueous solution including the amine-based compound is not limited in kind as long as the amine-based compound is an amine-based compound used for manufacturing a water treatment membrane, but as a specific example thereof, one or more selected from the group consisting of m-phenylenediamine, p-phenylenediamine, 1,3,6-benzenetriamine, 4-chloro-1,3-phenylenediamine, 3-chloro-1,4-phenylenediamine and a mixture thereof is preferred.

According to an exemplary embodiment of the present specification, the acyl halide compound is not particularly limited, but can be, for example, a mixture of one or more selected from the group consisting of trimesoyl chloride, isophthaloyl chloride, terephthaloyl chloride, and a mixture thereof, as an aromatic compound having 2 to 3 carboxylic acid halides.

According to an exemplary embodiment of the present specification, a content of the amine-based compound can be 0.1 wt % or more and 15 wt % or less, preferably, 0.1 wt % or more and 10 wt % or less, based on the aqueous solution including the amine-based compound. When the content of the amine-based compound is less than 0.1 wt %, the reaction with the organic solution including the acyl halide compound may not be smoothly performed, and when the content thereof is more than 15 wt %, it can be difficult for the amine-based compound to be stably dissolved in the aqueous solution.

Further, according to an exemplary embodiment of the present specification, the content of the acyl halide compound can be 0.1 wt % or more and 0.5 wt % or less, based on the organic solution including the acyl halide compound. That is, according to an exemplary embodiment of the present specification, when the content of the acyl halide compound is 0.1 wt % or more based on the organic solution including the acyl halide compound, there is an effect capable of preventing a phenomenon in which the salt rejection and flux of a finally manufactured membrane are reduced, and when the content thereof is 0.5 wt % or less based on the organic solution including the acyl halide compound, there is an effect capable of preventing the salt rejection of a finally manufactured membrane from being reduced.

According to an exemplary embodiment of the present specification, the aqueous solution can further include a surfactant.

According to an exemplary embodiment of the present specification, the surfactant can be selected from non-ionic, cationic, anionic, and amphoteric surfactants. According to an exemplary embodiment of the present specification, the surfactant can be a surfactant selected from among sodium lauryl sulfate (SLS), alkyl ether sulfates, alkyl sulfates, olefin sulfonates, alkyl ether carboxylates, sulfosuccinates, aromatic sulfonates, octylphenol ethoxylates, ethoxylated nonylphenols, alkyl poly(ethylene oxide), a copolymer of poly(ethylene oxide) and poly(propylene oxide), alkyl polyglucosides such as octyl glucoside and decyl maltoside, fatty acid alcohols such as cetyl alcohol, oleyl alcohol, cocamide MEA, cocamide DEA, alkyl hydroxyethyl dimethyl ammonium chloride, cetyltrimethylammonium bromide, cetyltrimethylammonium chloride, hexadecyltrimethylammonium bromide, and hexadecyltrimethylammonium chloride, and alkyl betaines. Specifically, the surfactant can be SLS, octylphenol ethoxylates or ethoxylated nonylphenols.

According to an exemplary embodiment of the present specification, the content of the surfactant can be 0.005 wt % or more 0.5 wt % or less based on the aqueous solution.

In addition, according to an exemplary embodiment of the present specification, the organic solution can further include an organic solvent, and as the organic solvent, it is possible to use an aliphatic hydrocarbon solvent, for example, Freons and a hydrophobic liquid which is immiscible with water, such as hexane, cyclohexane, heptane, and an alkane, which have 5 to 12 carbon atoms, for example, an alkane having 5 to 12 carbon atoms, and IsoPar (Exxon), ISOL-C(SK Chem.), ISOL-G (Exxon), and the like, which are a mixture thereof, but the organic solvent is not limited thereto.

According to an exemplary embodiment of the present specification, the organic solvent can be included in an amount of 80 parts by weight or more and 99.499 parts by weight or less based on 100 parts by weight of the organic solution. When the content of the organic solvent is 80 parts by weight or more based on 100 parts by weight of the organic solution, there is an effect capable of preventing a phenomenon in which the salt rejection and flux of a finally manufactured membrane are reduced, and when the content thereof is 99.499 parts by weight or less based on 100 parts by weight of the organic solution, there is an effect capable of preventing a phenomenon in which the salt rejection of a finally manufactured membrane is reduced.

According to an exemplary embodiment of the present specification, the water treatment membrane can be used as a microfiltration membrane, an ultrafiltration membrane, a nanofiltration membrane, or a reverse osmosis membrane, or the like, and specifically, the water treatment membrane can be used as a reverse osmosis membrane.

Another exemplary embodiment of the present specification provides a water treatment module including the above-described water treatment membrane.

The specific kind of water treatment module is not particularly limited, and examples thereof include a plate & frame module, a tubular module, a hollow & fiber module, or a spiral wound module, and the like. Furthermore, the other constitutions and manufacturing methods of the water treatment module, and the like are not particularly limited as long as the water treatment module includes the above-described water treatment membrane according to an exemplary embodiment of the present specification, and general means publicly known in this field can be adopted without limitation.

Meanwhile, the water treatment module according to an exemplary embodiment of the present specification has excellent salt rejection and flux, and excellent chemical stability and thus can be usefully used in a water treatment apparatus such as a domestic/industrial water purification apparatus, a sewage treatment apparatus, and a sea and fresh water treatment apparatus.

Hereinafter, the present specification will be described in detail with reference to Examples in order to specifically explain the present specification. However, the Examples according to the present specification can be modified in various forms, and it is not interpreted that the scope of the present specification is limited to the Examples described below in detail. The Examples of the present specification are provided to more completely explain the present specification to a person with ordinary skill in the art.

<EXAMPLES> MANUFACTURE OF WATER TREATMENT MEMBRANE

Example 1

18 wt % of a polysulfone solid content was put into N,N-dimethylformamide (DMF), and the resulting mixture was dissolved at 80° C. to 85° C. for 12 hours or more to obtain a uniform liquid phase. The solution was cast to a thickness of 150 μm on a polyester non-woven fabric having a thickness of 95 μm to 100 μm. Then, the cast non-woven fabric was put into water to manufacture a porous polysulfone support. In this case, the support was manufactured to have a width of 400 nm.

A solution including 10 wt % of triethylammonium camphorsulfonate (TEACSA) based on the entire solution and water was applied on the porous polysulfone support by a slot-coating method.

Thereafter, an aqueous solution including 5 wt % of m-phenylene diamine (mPD) and 0.1 wt % of the following Compound A based on the entire aqueous solution was applied on the porous polysulfone support at a speed of 16 m/min by a slot coating method to form an aqueous solution layer. Furthermore, any extra aqueous solution generated during the application was removed by using an air knife.

An organic solution including 0.3 wt % of TMC based on the entire organic solution and an organic solvent (IsoPar G) was applied on the aqueous solution layer at a speed of 16 m/min by a slot coating method. Then, the liquid phase components were dried at 95° C. until all of the liquid phase components were evaporated, and then washed with ultrapure water (DIW) to manufacture a water treatment membrane. In this case, the membrane was manufactured to have a width of 380 nm.

Example 2

A water treatment membrane was manufactured in the same manner as in Example 1, except that in Example 2, an aqueous solution including 5 wt % of m-phenylene diamine (mPD) and 0.2 wt % of the following Compound A was used instead of the aqueous solution including 5 wt % of m-phenylene diamine (mPD) and 0.1 wt % of the following Compound A based on the entire aqueous solution.

Example 3

A water treatment membrane was manufactured in the same manner as in Example 1, except that in Example 3, an aqueous solution including 5 wt % of m-phenylene diamine (mPD) and 0.3 wt % of the following Compound A was used instead of the aqueous solution including 5 wt % of m-phenylene diamine (mPD) and 0.1 wt % of the following Compound A based on the entire aqueous solution.

Example 4

A water treatment membrane was manufactured in the same manner as in Example 1, except that in Example 4, an aqueous solution including 5 wt % of m-phenylene diamine (mPD) and 0.4 wt % of the following Compound A was used instead of the aqueous solution including 5 wt % of m-phenylene diamine (mPD) and 0.1 wt % of the following Compound A based on the entire aqueous solution.

Example 5

A water treatment membrane was manufactured in the same manner as in Example 1, except that in Example 5, an aqueous solution including 5 wt % of m-phenylene diamine (mPD) and 0.5 wt % of the following Compound A was used instead of the aqueous solution including 5 wt % of m-phenylene diamine (mPD) and 0.1 wt % of the following Compound A based on the entire aqueous solution.

Example 6

18 wt % of a polysulfone solid content was put into N,N-dimethylformamide (DMF), and the resulting mixture was dissolved at 80° C. to 85° C. for 12 hours or more to obtain a uniform liquid phase. The solution was cast to a thickness of 150 μm on a polyester non-woven fabric having a thickness of 95 μm to 100 μm. Then, the cast non-woven fabric was put into water to manufacture a porous polysulfone support. In this case, the support was manufactured to have a width of 400 nm.

A solution including 10 wt % of triethylammonium camphorsulfonate (TEACSA) based on the entire solution and water was applied on the porous polysulfone support by a slot-coating method.

Thereafter, an aqueous solution including 5 wt % of m-phenylene diamine (mPD) and 0.1 wt % of the following Compound B based on the entire aqueous solution was applied on the porous polysulfone support at a speed of 16 m/min by a slot coating method to form an aqueous solution layer. Furthermore, an extra aqueous solution generated during the application was removed by using an air knife.

An organic solution including 0.3 wt % of TMC based on the entire organic solution and an organic solvent (IsoPar G) was applied on the aqueous solution layer at a speed of 16 m/min by a slot coating method. Then, the liquid phase components were dried at 95° C. until all of the liquid phase components were evaporated, and then washed with ultrapure water (DIW) to manufacture a water treatment membrane. In this case, the membrane was manufactured to have a width of 380 nm.

Example 7

A water treatment membrane was manufactured in the same manner as in Example 6, except that in Example 7, an aqueous solution including 5 wt % of m-phenylene diamine (mPD) and 0.3 wt % of the following Compound B was used instead of the aqueous solution including 5 wt % of m-phenylene diamine (mPD) and 0.1 wt % of the following Compound B based on the entire aqueous solution.

Comparative Example 1

A water treatment membrane was manufactured in the same manner as in Example 1, except that in Comparative Example 1, an aqueous solution including 5 wt % of m-phenylene diamine (mPD), which does not include a biguanidine compound, was used instead of the aqueous solution including 5 wt % of m-phenylene diamine (mPD) and 0.1 wt % of the following Compound A based on the entire aqueous solution.

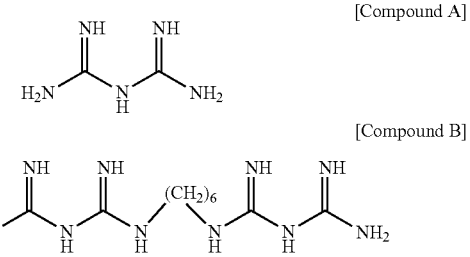

Comparative Example 2

18 wt % of a polysulfone solid content was put into N,N-dimethylformamide (DMF), and the resulting mixture was dissolved at 80° C. to 85° C. for 12 hours or more to obtain a uniform liquid phase. The solution was cast to a thickness of 150 μm on a polyester non-woven fabric having a thickness of 95 μm to 100 μm. Then, the cast non-woven fabric was put into water to manufacture a porous polysulfone support. In this case, the support was manufactured to have a width of 400 nm.

A solution including 10 wt % of triethylammonium camphorsulfonate (TEACSA) based on the entire solution and water was applied on the porous polysulfone support by a slot-coating method.

Thereafter, an aqueous solution including 5 wt % of m-phenylene diamine (mPD) and 0.1 wt % of the following Compound C based on the entire aqueous solution was applied on the porous polysulfone support at a speed of 16 m/min by a slot coating method to form an aqueous solution layer. Furthermore, an extra aqueous solution generated during the application was removed by using an air knife.

An organic solution including 0.3 wt % of TMC based on the entire organic solution and an organic solvent (IsoPar G) was applied on the aqueous solution layer at a speed of 16 m/min by a slot coating method. Then, the liquid phase components were dried at 95° C. until all of the liquid phase components were evaporated, and then washed with ultrapure water (DIW) to manufacture a water treatment membrane. In this case, the membrane was manufactured to have a width of 380 nm.

Comparative Example 3

A water treatment membrane was manufactured in the same manner as in Comparative Example 2, except that in Comparative Example 3, an aqueous solution including 5 wt % of m-phenylene diamine (mPD) and 0.2 wt % of the following Compound C was used instead of the aqueous solution including 5 wt % of m-phenylene diamine (mPD) and 0.1 wt % of the following Compound C based on the entire aqueous solution.

Comparative Example 4

A water treatment membrane was manufactured in the same manner as in Comparative Example 2, except that in Comparative Example 4, an aqueous solution including 5 wt % of m-phenylene diamine (mPD) and 0.3 wt % of the following Compound C was used instead of the aqueous solution including 5 wt % of m-phenylene diamine (mPD) and 0.1 wt % of the following Compound C based on the entire aqueous solution.

Comparative Example 5

A water treatment membrane was manufactured in the same manner as in Comparative Example 2, except that in Comparative Example 5, an aqueous solution including 5 wt % of m-phenylene diamine (mPD) and 0.4 wt % of the following Compound C was used instead of the aqueous solution including 5 wt % of m-phenylene diamine (mPD) and 0.1 wt % of the following Compound C based on the entire aqueous solution.

Comparative Example 6

A water treatment membrane was manufactured in the same manner as in Comparative Example 2, except that in Comparative Example 6, an aqueous solution including 5 wt % of m-phenylene diamine (mPD) and 0.5 wt % of the following Compound C was used instead of the aqueous solution including 5 wt % of m-phenylene diamine (mPD) and 0.1 wt % of the following Compound C based on the entire aqueous solution.

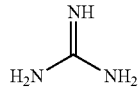

[Compound C]

Experimental Example 1

1) NMR Analysis

A result of analyzing NMR of the water treatment membrane manufactured in Example 3 was described below.

The $^1$H-NMR analysis was carried out at room temperature by using an NMR spectrometer including a Varian Unity Inova (500 MHZ) spectrometer equipped with a triple resonance 5 mm probe. A material to be analyzed was used by being diluted at a concentration of about 10 mg/ml in a solvent ($D_2O$) for NMR measurement.

The $^{13}$C-NMR analysis was carried out at room temperature by using an NMR spectrometer including a Varian Unity Inova (500 MHZ) spectrometer equipped with a triple resonance 5 mm probe. A material to be analyzed was used by being diluted at a concentration of about 10 mg/ml in a solvent ($D_2O$) for NMR measurement.

The $^{13}$C-NMR analysis was measured with an instrument which is the same as the $^1$H-NMR analysis device, and was measured by differently setting only the pulse sequences during the measurement.

Two measurements including a method for measuring a surface of a membrane before being dissociated in an acid or a base and a method for measuring a surface of a membrane after being dissociated in the acid (HCl) or the base (NaOH) were carried out, the results are shown in the following Table 1, and the results of $^1$H-NMR analysis are illustrated in FIG. 2.

Even when the water treatment membrane is dissociated in an acid or a base, or simultaneously dissociated in the acid and the base, similar results were measured, and the acid or base treatment means severe damage to the membrane which forms a covalent bond.

TABLE 1

| Condition | Result |
|---|---|
| $^1$H-NMR (400 MHz, $D_2O$) | δ7.45 (t, J = 8.1 Hz, 1H, aromate: CH═CH—CH), δ7.33 (t, J = 2.0 Hz, 1H, aromate: N—C═CH—C—N), δ7.15 (dd, J = 8.1, 2.1 Hz, 2H, aromate: CH═CH—CH) |
| $^{13}$C-NMR (400 MHz, $D_2O$) | δ163.83 (2 × C═NH), δ160.34 (2 × C═NH), δ140.16 (N—C═CH—CN), δ133.12 (CH═CH—CH), δ123.68 (CH═CH—CH), δ121.68 (N—C═CH—C—N) |

TABLE 1-continued

| Condition | Result |
|---|---|
| $^{13}$C-NMR (400 MHz, D$_2$O) | δ159.95 (2 × C=NH) |
| $^1$H-NMR (500 MHz, DMSO-d6) | δ10.22-10.96 (s, NH), δ9.36-9.87 (—N—C=NH) |
| $^1$H-NMR (250 MHz, DMSO-d6, 258 C, TMS, d) | δ1.28 (Sb, 2(2H)n; g-CH2), δ1.43 (Sb, 2(2H)n; b-CH2), δ3.08 (Sb, 2(2H)n; a-CH2N), δ6.90-7.80(mb, 6(1H)n; NH) |
| $^{13}$C-NMR (250 MHz, DMSO-d6, 258 C, TMS, d) | δ25.3 (g-CH2), δ28.5 (b-CH2), δ118.0 (a-CH2N), δ155.4160.9 (C¼N) |
| $^1$H-NMR (250 MHz, DMSO-d6, 258 C, TMS, d) | δ3.17-3.92 (mb, 2(2H)n; a-CH2N), δ6.77-8.86 (mb, 6(1H)n; NH) |

2) IR Analysis

A result of analyzing IR of the water treatment membrane manufactured in Example 3 was described below.

Spectra were measured through an ATR mode using FT-IR spectroscopy. Two measurements including a method for measuring a surface of a membrane before being dissociated in an acid or a base and a method for measuring a surface of a membrane by mixing a film, which is dried after being dissociated in the acid (HCl) or the base (NaOH), with KBr were carried out, and the results are shown in the following Table 2.

TABLE 2

| Condition | Result |
|---|---|
| IR (solid) Analysis: Wave number; v (cm$^{-1}$) | 3292, 3136, 1628, 1575, 1541, 1525, 1448, 1394, 1283, 781, 600, 468 cm$^{-1}$ |
| IR (solid) Analysis: Wave number; v (cm$^{-1}$) | 3319, 3160, 3111, 3034, 1686, 1627, 1153, 1078, 1029, 970, 596, 529, 472, 437 cm$^{-1}$ |
| IR (KBr) Analysis | n¼3300 (s), 3204 (m; n(N—H)), 2921 (w; n(C—H)), 2177 (s; n(C=N)), 1630 (s), 1599 (m), 1560 (s; d(N—H)), 1441 (m), 1420(w; d(CH2)), 1384 (s), 1297 (m), 1150 (w), 1076 (m; n(C—N)), 779 (m; d(CH2) cm$^{-1}$ |

3) MS Analysis

A result of analyzing MS of the water treatment membrane manufactured in Example 3 after dissociating the water treatment membrane in an acid or a base was described below.

For an m/z analysis, an LC/MS analysis was carried out at 40° C. with C18 columns by using an ESI positive ionization method, and the results are shown in the followings and FIG. 3.

ESI-MS Analysis: as a result of dissociation in the acid (HCl) or the base (NaOH), m/z=277, 193, 178, 102, 85, 60 [M+H]$^+$.

According to Experimental Example 1, it can be seen that the water treatment membrane according to an exemplary embodiment of the present specification has four benzene ring peaks present between 6.8 ppm and 7.8 ppm during the $^1$H-NMR analysis.

According to Experimental Example 1, it can be seen that the water treatment membrane according to an exemplary embodiment of the present specification exhibits C=N and N—C—N peaks because the biguanidine compound is present as a covalent bond in the polyamide active layer, and thus only the covalently bonded biguanidine remains in the polyamide active layer even after the water treatment membrane is dissociated in an acid or a base.

However, a water treatment membrane manufactured by adding a biguanidine compound as an additive does not have any analysis result in which the corresponding functional group is introduced into the main chain thereof as a covalent bond, and when a biguanidine group is used as an additive, there is a disadvantage in that it is not possible to confirm whether the biguanidine group is present inside a polyamide active layer or washed away. Further, when the surface (solid) of the membrane is measured, C=N and N—C—N peaks can appear due to a biguanidine group embedded in the water treatment membrane, but when the water treatment membrane is dissociated in an acid or a base, the biguanidine compound is dissociated, and as a result, the peaks disappear.

According to the result of Experimental Example 1 as described above, it can be confirmed that in the water treatment membrane manufactured by the exemplary embodiment of the present invention, the biguanidine compound forms a covalent bond with the amine-based compound or the acyl halide compound.

Experimental Example 2

After it was confirmed that the water treatment membranes manufactured in Examples 1 to 7 and Comparative Examples 1 to 6 were stabilized by performing an operation of an apparatus using an aqueous NaCl solution at 32,000 ppm and a flux of 4.5 L/min at 800 psi for approximately 1 hour, the results of calculating the flux (gallon/ft$^2$/day (gfd)) by measuring an amount of water permeated at 25° C. for 10 minutes, and the results of calculating the salt rejection by analyzing the salt concentration before and after the permeation using a conductivity meter are shown in the following Table 3.

TABLE 3

| | Compound included in polyamide active layer | Content of compound (wt %) | Flux (GFD) | Rate (%) of change in flux | Salt rejection (%) | Amount (%) of change in salt rejection |
|---|---|---|---|---|---|---|
| Example 1 | Compound A | 0.1 | 19.00 | −3 | 99.83 | 0.09 |
| Example 2 | Compound A | 0.2 | 18.38 | −6 | 99.85 | 0.11 |
| Example 3 | Compound A | 0.3 | 18.36 | −6 | 99.88 | 0.14 |
| Example 4 | Compound A | 0.4 | 17.98 | −8 | 99.87 | 0.13 |

TABLE 3-continued

| | Compound included in polyamide active layer | Content of compound (wt %) | Flux (GFD) | Rate (%) of change in flux | Salt rejection (%) | Amount (%) of change in salt rejection |
|---|---|---|---|---|---|---|
| Example 5 | Compound A | 0.5 | 18.25 | −6 | 99.89 | 0.15 |
| Example 6 | Compound B | 0.1 | 17.51 | −10 | 99.86 | 0.12 |
| Example 7 | Compound B | 0.3 | 15.53 | −20 | 99.90 | 0.16 |
| Comparative Example 1 | — | 0 | 19.50 | — | 99.74 | — |
| Comparative Example 2 | Compound C | 0.1 | 18.36 | −6 | 99.80 | 0.06 |
| Comparative Example 3 | Compound C | 0.2 | 18.94 | −3 | 99.80 | 0.06 |
| Comparative Example 4 | Compound C | 0.3 | 20.90 | 7 | 99.78 | 0.04 |
| Comparative Example 5 | Compound C | 0.4 | 18.94 | −3 | 99.79 | 0.05 |
| Comparative Example 6 | Compound C | 0.5 | 17.77 | −9 | 99.79 | 0.05 |

In Table 3, the rate of change in flux and the amount of change in salt rejection are values which describe the rate of change in flux and the amount of change in salt rejection with respect to Examples 1 to 7 and Comparative Examples 2 to 6 as compared to Comparative Example 1.

According to the results in Table 3, it could be confirmed that the water treatment membrane according to an exemplary embodiment of the present specification had a more improved salt rejection as compared to Comparative Examples 1 to 6 in which the biguanidine compound is not included in the polyamide layer.

This is because a high salt rejection and a boron rejection are maintained regardless of driving time and condition when the biguanidine compound is stably present in the polyamide active layer through a covalent bond with the amine-based compound or the acyl halide compound.

Further, when the amounts of change in salt rejection are compared with each other, it can be seen that Examples 1 to 5 including a biguanidine compound in the polyamide active layer have a rate of change in flux similar to those of Comparative Examples 2 to 6 including the guanidine compound, and an excellent effect of improving the salt rejection.

Experimental Example 3

For Compound A and a poly(hexamethylene biguanide) (PHB) polymer (molecular weight of 600 to 900 g/mol), a result of performing the $^{13}$C-NMR analysis in the same manner as in Experimental Example 1 is shown in FIG. 4. It can be confirmed that in the case of PHB, since a functional group capable of forming a covalent bond with mPD or TMC is not present at ends thereof, the bond cannot be formed in the polyamide active layer, and thus only C═O of TMC is detected, but in the case of Compound A, since an amine group is present at ends thereof, and thus a covalent bond can be formed, not only C═O of TMC, but also biguanide are detected together.

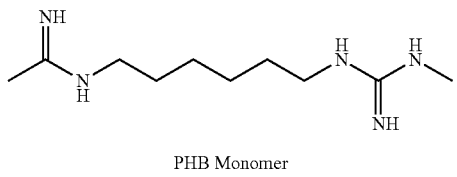

PHB Monomer

Although the preferred exemplary embodiments of the present invention have been described above, the present invention is not limited thereto, and various modifications can be made and carried out within the scope of the claims and the detailed description of the invention, and also fall within the scope of the invention.

EXPLANATION OF REFERENCE NUMERALS AND SYMBOLS

100: Non-woven fabric
200: Porous support layer
300: Polyamide active layer
400: Saltwater
500: Purified water
600: Concentrated water

The invention claimed is:

1. A water treatment membrane, comprising:
a porous support; and
a polyamide active layer provided on the porous support, wherein the polyamide active layer comprises a biguanidine compound including three or more nitrogen atoms, in which both ends of the biguanidine compound are bonded to the main chain of the polyamide active layer by forming a covalent bond with an amine-based compound or an acyl halide compound in the polyamide active layer resulting in one or more units selected from among a unit of the following Chemical Formula 1, a unit of the following Chemical Formula 2, a unit of the following Chemical Formula 3, and a unit of the following Chemical Formula 4:

[Chemical Formula 1]

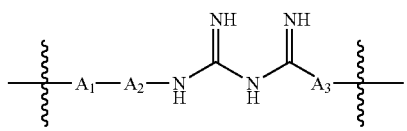

[Chemical Formula 2]

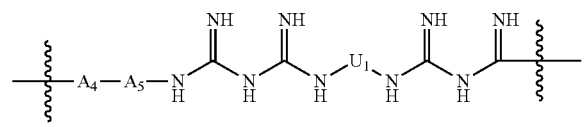

[Chemical Formula 3]

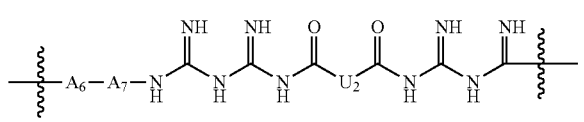

[Chemical Formula 4]

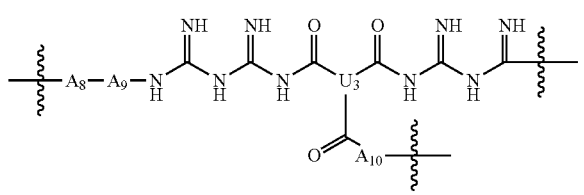

wherein in Chemical Formulae 1 to 4:
$U_1$ and $U_2$ are the same as or different from each other, and are each independently a substituted or unsubstituted divalent aliphatic group, a substituted or unsubstituted divalent alicyclic group, or a substituted or unsubstituted divalent aromatic group,
$U_3$ is a substituted or unsubstituted trivalent aliphatic group, a substituted or unsubstituted trivalent alicyclic group, or a substituted or unsubstituted trivalent aromatic group;
$A_1$ to $A_9$ are the same as or different from each other, and are each independently any one of the following Chemical Formulae 5 to 7;
$A_{10}$ is any one of the following Chemical Formula 5 or 8;

[Chemical Formula 5]

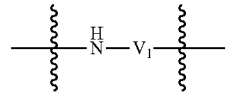

[Chemical Formula 6]

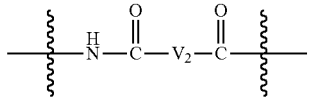

[Chemical Formula 7]

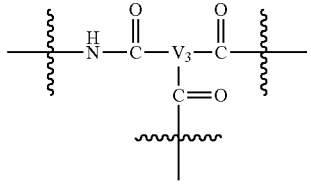

[Chemical Formula 8]

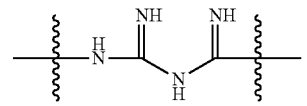

wherein in Chemical Formulae 5 to 8:
$V_1$ and $V_2$ are the same as or different from each other, and are each independently a substituted or unsubstituted phenylene group, and
$V_3$ is a substituted or unsubstituted trivalent benzene ring group; and
provided that one of $A_1$ to $A_3$, one of $A_4$ and $A_5$, one of $A_6$ and $A_7$, and one of $A_8$ and $A_9$ is Chemical Formula 5.

2. The water treatment membrane of claim 1, wherein the water treatment membrane exhibits a peak of a benzene ring between 6.8 ppm and 7.8 ppm as a result of $^1$H-NMR analysis before and after the water treatment membrane is dissociated in an acid or a base.

3. The water treatment membrane of claim 1, wherein an amount of one or more units selected from among the unit of Chemical Formula 1, the unit of Chemical Formula 2, the unit of Chemical Formula 3, and the unit of Chemical Formula 4 in the polyamide active layer is 0.01 wt % to 10 wt %.

4. The water treatment membrane of claim 1, wherein the water treatment membrane exhibits peaks of a C=N bond and a N—C—N bond as a result of IR analysis before and after the water treatment membrane is dissociated in the acid or the base.

5. The water treatment membrane of claim 1, wherein the water treatment membrane exhibits an m/z value of 277, 193, 178, 102, 85 or 60 as a result of MS analysis after the water treatment membrane is dissociated in the acid or the base.

6. A method for manufacturing the water treatment membrane of claim 1, the method comprising:
preparing a porous support; and
forming a polyamide active layer on the porous support,
wherein the forming of the polyamide active layer comprises an interfacial polymerization using an aqueous solution comprising an amine-based compound and an organic solution comprising an acyl halide compound,
at least one of the aqueous solution comprising the amine-based compound and the organic solution comprising the acyl halide compound comprises one or more biguanidine compounds of the following Chemical Formula 9 or Chemical Formula 10, and
each end of the biguanidine compound separately forms a covalent bond with the amine-based compound or the acyl halide compound in the polyamide active layer thereby being covalently bonded to the main chain of the polyamide active layer:

[Chemical Formula 9]

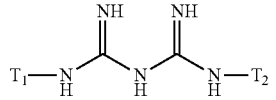

[Chemical Formula 10]

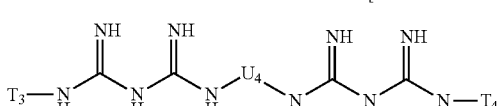

wherein in Chemical 10:
$U_4$ is a substituted or unsubstituted divalent aliphatic group, a substituted or unsubstituted divalent alicyclic group, or a substituted or unsubstituted divalent aromatic group; and
$T_1$ to $T_4$ are the same as or different from each other, and are each independently hydrogen, deuterium, a nitrile group, a hydroxyl group, an acyl halide group, an isocyanate group, or a substituted or unsubstituted amine group.

7. The method of claim 6, wherein the biguanidine compound is present in an amount of 0.01 wt % to 10 wt % in the aqueous solution comprising the amine-based compound or the organic solution comprising the acyl halide compound.

8. The method of claim 6, wherein the amine-based compound is one or more selected from the group consisting of m-phenylenediamine, p-phenylenediamine, 1,3,6-benzenetriamine, 4-chloro-1,3-phenylenediamine, 3-chloro-1,4-phenylenediamine, and a mixture thereof.

9. The method of claim 6, wherein the acyl halide compound is one or more selected from the group consisting of trimesolyl chloride, isophthaloyl chloride, terephthaloyl chloride, and a mixture thereof.

10. A water treatment module comprising the water treatment membrane of claim 1.

\* \* \* \* \*